United States Patent
Levy et al.

(10) Patent No.: US 10,644,995 B2
(45) Date of Patent: May 5, 2020

(54) ADAPTIVE ROUTING IN A BOX

(71) Applicant: Mellanox Technologies TLV Ltd., Raanana (IL)

(72) Inventors: Gil Levy, Hod Hasharon (IL); Barak Gafni, Campbell, CA (US)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 33 days.

(21) Appl. No.: 15/896,088

(22) Filed: Feb. 14, 2018

(65) Prior Publication Data

US 2019/0253345 A1    Aug. 15, 2019

(51) Int. Cl.
  *H04L 12/717* (2013.01)
  *H04L 12/803* (2013.01)
  *H04L 12/937* (2013.01)

(52) U.S. Cl.
  CPC ............ *H04L 45/42* (2013.01); *H04L 47/125* (2013.01); *H04L 49/254* (2013.01)

(58) Field of Classification Search
  CPC ...... H04L 45/42; H04L 49/254; H04L 47/125
  See application file for complete search history.

(56) References Cited

U.S. PATENT DOCUMENTS

| | | | |
|---|---|---|---|
| 4,312,064 A | 1/1982 | Bench et al. | |
| 6,115,385 A | 9/2000 | Vig | |
| 6,169,741 B1 | 1/2001 | Lemaire et al. | |
| 6,480,500 B1 | 11/2002 | Erimli et al. | |
| 6,532,211 B1 | 3/2003 | Rathonyi et al. | |
| 6,553,028 B1 | 4/2003 | Tang et al. | |
| 6,614,758 B2 | 9/2003 | Wong et al. | |
| 6,665,297 B1 | 12/2003 | Hariguchi et al. | |
| 6,775,268 B1 | 8/2004 | Wang et al. | |
| 6,795,886 B1 | 9/2004 | Nguyen | |
| 6,804,532 B1 | 10/2004 | Moon et al. | |
| 6,807,175 B1 | 10/2004 | Jennings et al. | |
| 6,831,918 B1 | 12/2004 | Kavak | |
| 6,912,589 B1 | 6/2005 | Jain et al. | |
| 6,912,604 B1 | 6/2005 | Tzeng et al. | |
| 6,950,428 B1 | 9/2005 | Horst et al. | |
| 7,010,607 B1 | 3/2006 | Bunton | |
| 7,076,569 B1 | 7/2006 | Bailey et al. | |
| 7,234,001 B2 | 6/2007 | Simpson et al. | |
| 7,274,869 B1 | 9/2007 | Pan et al. | |
| 7,286,535 B2 | 10/2007 | Ishikawa et al. | |
| 7,676,597 B2 | 3/2010 | Kagan et al. | |

(Continued)

FOREIGN PATENT DOCUMENTS

WO    2016105446 A1    6/2016

OTHER PUBLICATIONS

U.S. Appl. No. 15/356,588 office action dated Jul. 11, 2018.

(Continued)

*Primary Examiner* — Steven H Nguyen
(74) *Attorney, Agent, or Firm* — Kligler & Associates Patent Attorneys LTD

(57) ABSTRACT

A network box accepts packets from a network in ingress ports of a first tier of leaf switches, adaptively routes the packets from the leaf switches to a second tier of spine switches within the network box, statically routes the packets from the spine switches to designated egress ports of the leaf switches, and transmits the packets from the designated egress ports into the network.

10 Claims, 5 Drawing Sheets

(56) References Cited

U.S. PATENT DOCUMENTS

| | | |
|---|---|---|
| 7,746,854 B2 | 6/2010 | Ambe et al. |
| 7,899,930 B1 | 3/2011 | Turner et al. |
| 7,924,837 B1 | 4/2011 | Shabtay et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,681,641 B1 | 3/2014 | Sajassi et al. |
| 8,755,389 B1 | 6/2014 | Poutievski et al. |
| 8,774,063 B2 | 7/2014 | Beecroft |
| 8,867,356 B2 | 10/2014 | Bloch et al. |
| 8,873,567 B1 | 10/2014 | Mandal et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,571,400 B1 | 2/2017 | Mandal et al. |
| 2001/0043564 A1 | 11/2001 | Bloch et al. |
| 2001/0043614 A1 | 11/2001 | Viswanadham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0071439 A1 | 6/2002 | Reeves et al. |
| 2002/0085586 A1 | 7/2002 | Tzeng |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0097438 A1 | 5/2003 | Bearden et al. |
| 2003/0223453 A1 | 12/2003 | Stoler et al. |
| 2004/0024903 A1 | 2/2004 | Costatino et al. |
| 2004/0062242 A1 | 4/2004 | Wadia et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0215645 A1 | 9/2006 | Kangyu |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0104192 A1 | 5/2007 | Yoon et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0101378 A1 | 5/2008 | Krueger |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0022154 A1 | 1/2009 | Kiribe et al. |
| 2009/0097496 A1 | 4/2009 | Nakamura et al. |
| 2009/0103534 A1 | 4/2009 | Malledant et al. |
| 2009/0119565 A1 | 5/2009 | Park et al. |
| 2009/0262741 A1 | 10/2009 | Jungck et al. |
| 2010/0020796 A1 | 1/2010 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 | 1/2011 | Fernandez |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0164518 A1 | 7/2011 | Daraiseh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0204933 A1 | 8/2013 | Cardona et al. |
| 2013/0208720 A1 | 8/2013 | Ellis et al. |
| 2013/0242745 A1 | 9/2013 | Umezuki |
| 2013/0297757 A1 | 11/2013 | Han et al. |
| 2013/0301646 A1 | 11/2013 | Bogdanski et al. |
| 2013/0315237 A1 | 11/2013 | Kagan et al. |
| 2013/0322256 A1 | 12/2013 | Bader et al. |
| 2013/0329727 A1 | 12/2013 | Rajagopalan et al. |
| 2013/0336116 A1 | 12/2013 | Vasseur et al. |
| 2013/0336164 A1* | 12/2013 | Yang .................... H04L 47/125 370/255 |
| 2014/0022942 A1 | 1/2014 | Han et al. |
| 2014/0043959 A1 | 2/2014 | Owens et al. |
| 2014/0140341 A1 | 5/2014 | Bataineh et al. |
| 2014/0192646 A1 | 7/2014 | Mir et al. |
| 2014/0198636 A1 | 7/2014 | Thayalan et al. |
| 2014/0211631 A1 | 7/2014 | Haramaty et al. |
| 2014/0211808 A1 | 7/2014 | Koren et al. |
| 2014/0269305 A1 | 9/2014 | Nguyen |
| 2014/0313880 A1 | 10/2014 | Lu et al. |
| 2014/0328180 A1 | 11/2014 | Kim et al. |
| 2014/0343967 A1 | 11/2014 | Baker |
| 2015/0030033 A1 | 1/2015 | Vasseur et al. |
| 2015/0052252 A1 | 2/2015 | Gilde et al. |
| 2015/0092539 A1 | 4/2015 | Sivabalan et al. |
| 2015/0098466 A1 | 4/2015 | Haramaty et al. |
| 2015/0124815 A1 | 5/2015 | Beliveau et al. |
| 2015/0127797 A1* | 5/2015 | Attar .................... H04L 47/125 709/223 |
| 2015/0131663 A1* | 5/2015 | Brar .................... H04L 45/745 370/392 |
| 2015/0163144 A1 | 6/2015 | Koponen et al. |
| 2015/0172070 A1 | 6/2015 | Csaszar |
| 2015/0194215 A1 | 7/2015 | Douglas et al. |

(56) References Cited

U.S. PATENT DOCUMENTS

| | | |
|---|---|---|
| 2015/0195204 A1 | 7/2015 | Haramaty et al. |
| 2015/0295858 A1 | 10/2015 | Chrysos et al. |
| 2015/0372898 A1 | 12/2015 | Haramaty et al. |
| 2015/0372916 A1 | 12/2015 | Haramaty et al. |
| 2016/0014636 A1 | 1/2016 | Bahr et al. |
| 2016/0028613 A1 | 1/2016 | Haramaty et al. |
| 2016/0043933 A1* | 2/2016 | Gopalarathnam .... H04L 45/124 709/226 |
| 2016/0080120 A1 | 3/2016 | Unger et al. |
| 2016/0080321 A1 | 3/2016 | Pan et al. |
| 2016/0182378 A1 | 6/2016 | Basavaraja et al. |
| 2016/0294715 A1 | 10/2016 | Raindel et al. |
| 2017/0054445 A1 | 2/2017 | Wang |
| 2017/0054591 A1 | 2/2017 | Hyoudou et al. |
| 2017/0068669 A1 | 3/2017 | Levy et al. |
| 2017/0180243 A1 | 6/2017 | Haramaty et al. |
| 2017/0187614 A1 | 6/2017 | Haramaty et al. |
| 2017/0244630 A1* | 8/2017 | Levy .................. H04L 43/0811 |
| 2017/0270119 A1 | 9/2017 | Kfir et al. |
| 2017/0286292 A1 | 10/2017 | Levy et al. |
| 2017/0331740 A1 | 11/2017 | Levy et al. |
| 2018/0026878 A1 | 1/2018 | Zahavi et al. |
| 2018/0139132 A1* | 5/2018 | Edsall ................. H04L 12/4633 |
| 2018/0302288 A1 | 10/2018 | Schmatz |

OTHER PUBLICATIONS

U.S. Appl. No. 15/152,077 office action dated Jul. 16, 2018.

Shpuner et al., U.S. Appl. No. 15/387,718, filed Dec. 22, 2016.

Shpiner et al., "Dragonfly+: Low Cost Topology for Scaling Datacenters", IEEE 3rd International Workshop on High Performance Interconnection Networks in the Exascale and Big-Data Era (HiPINEB), pp. 1-9, Feb. 2017.

U.S. Appl. No. 15/050,480 office action dated Nov. 2, 2018.

U.S. Appl. No. 15/356,588 office action dated Feb. 7, 2019.

U.S. Appl. No. 15/218,028 office action dated Feb. 6, 2019.

Leiserson, C E., "Fat-Trees: Universal Networks for Hardware Efficient Supercomputing", IEEE Transactions on Computers, vol. C-34, No. 10, pp. 892-901, Oct. 1985.

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM Sigmetrics—the International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

Infiniband Trade Association, "InfiniBandTM Architecture Specification vol. 1", Release 1.2.1, Nov. 2007.

Culley et al., "Marker PDU Aligned Framing for TCP Specification", IETF Network Working Group, RFC 5044, Oct. 2007.

Shah et al., "Direct Data Placement over Reliable Transports", IETF Network Working Group, RFC 5041, Oct. 2007.

Martinez et al., "Supporting fully adaptive routing in Infiniband networks", Proceedings of the International Parallel and Distributed Processing Symposium (IPDPS'03),Apr. 22-26, 2003.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "Dard: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.

Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.

Li et al., "Multicast Replication Using Dual Lookups in Large Packet-Based Switches", 2006 IET International Conference on Wireless, Mobile and Multimedia Networks, pp. 1-3, Nov. 6-9, 2006.

Nichols et al., "Definition of the Differentiated Services Field (DS Field) in the IPv4 and IPv6 Headers", Network Working Group, RFC 2474, 20 pages, Dec. 1998.

Microsoft., "How IPv4 Multicasting Works", 22 pages, Mar. 28, 2003.

Suchara et al., "Network Architecture for Joint Failure Recovery and Traffic Engineering", Proceedings of the ACM Sigmetrics joint international conference on Measurement and modeling of computer systems, pp. 97-108, Jun. 7-11, 2011.

IEEE 802.1Q, "IEEE Standard for Local and metropolitan area networks Virtual Bridged Local Area Networks", IEEE Computer Society, 303 pages, May 19, 2006.

Plummer, D., "An Ethernet Address Resolution Protocol," Network Working Group ,Request for Comments (RFC) 826, 10 pages, Nov. 1982.

Hinden et al., "IP Version 6 Addressing Architecture," Network Working Group ,Request for Comments (RFC) 2373, 26 pages, Jul. 1998.

Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.

Dally et al., "Deadlock-Free Message Routing in Multiprocessor Interconnection Networks", IEEE Transactions on Computers, vol. C-36, No. 5, May 1987, pp. 547-553.

Nkposong et al., "Experiences with BGP in Large Scale Data Centers:Teaching an old protocol new tricks", 44 pages, Jan. 31, 3014.

"Equal-cost multi-path routing", Wikipedia, 2 pages, Oct. 13, 2014.

Thaler et al., "Multipath Issues in Unicast and Multicast Next-Hop Selection", Network Working Group, RFC 2991, 9 pages, Nov. 2000.

Glass et al., "The turn model for adaptive routing", Journal of the ACM, vol. 41, No. 5, pp. 874-903, Sep. 1994.

Mahalingam et al., "VXLAN: A Framework for Overlaying Virtualized Layer 2 Networks over Layer 3 Networks", Internet Draft, 20 pages, Aug. 22, 2012.

Sinha et al., "Harnessing TCP's Burstiness with Flowlet Switching", 3rd ACM Sigcomm Workshop on Hot Topics in Networks (HotNets), 6 pages, Nov. 11, 2004.

Vishnu et al., "Hot-Spot Avoidance With Multi-Pathing Over IntiniBand: An MPI Perspective", Seventh IEEE International Symposium on Cluster Computing and the Grid (CCGrid'07), 8 pages, year 2007.

NOWLAB—Network Based Computing Lab, 2 pages, years 2002-2015 http://nowlab.cse.ohio-state.edu/publications/conf-presentations/2007/vishnu-ccgrid07.pdf.

(56) References Cited

OTHER PUBLICATIONS

Alizadeh et al.,"CONGA: Distributed Congestion-Aware Load Balancing for Datacenters", Cisco Systems, 12 pages, Aug. 9, 2014.
Geoffray et al., "Adaptive Routing Strategies for Modem High Performance Networks", 16th IEEE Symposium on High Performance Interconnects (HOTI '08), pp. 165-172, Aug. 26-28, 2008.
Anderson et al., "On the Stability of Adaptive Routing in the Presence of Congestion Control", IEEE Infocom, 11 pages, 2003.
Perry et al., "Fastpass: A Centralized "Zero-Queue" Datacenter Network", M.I.T. Computer Science & Artificial Intelligence Lab, 12 pages, year 2014.
Afek et al., "Sampling and Large Flow Detection in SDN", Sigcomm '15, pp. 345-346, Aug. 17-21, 2015, London, UK.
Amante et al., "IPv6 Flow Label Specification", Request for Comments: 6437, 15 pages, Nov. 2011.
Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.
U.S. Appl. No. 15/050,480 office action dated Jun. 28, 2019.
U.S. Appl. No. 15/356,588 Advisory Action dated May 23, 2019.
U.S. Appl. No. 15/356,588 office action dated Aug. 12, 2019.
U.S. Appl. No. 15/218,028 office action dated Jun. 26, 2019.

\* cited by examiner

ADAPTIVE ROUTING IN A BOX

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information over data networks. More particularly, this invention relates to performance of switched data networks.

2. Description of the Related Art

The meanings of certain acronyms and abbreviations used herein are given in Table 1.

TABLE 1

| Acronyms and Abbreviations | |
| --- | --- |
| ARN | Adaptive Routing Notification |
| ASIC | Application-Specific Integrated Circuit |
| BGP | Border Gateway Protocol |
| CPU | Central Processing Unit |
| ECMP | Equal Cost Multi-Path |
| NIC | Network Interface Card |
| SRAM | Static Random Access Memory |

A challenge in modern network technology is to implement a switch with a high port count or radix. A common way to scale switch bandwidth and radix is to connect multiple switches, for example in a Clos topology. This type of arrangement is referred to herein as a "box", although a common chassis is not essential. In such a box leaf switches connect with the network ports while spine switches interconnect with the leaf switches.

For example, U.S. Patent Application Publication No. 2017/0054445 to Wang et al., describes an integrated circuit comprising a plurality of switch matrices wherein the plurality of switch matrices are arranged in stages including (i) a first stage, configured in a hierarchical network (for example, a radix-4 network), (ii) a second stage configured in a hierarchical network (for example, a radix-2 or radix-3 network) and coupled to switches of the first stage, and (iii) a third stage configured in a mesh network and coupled to switches of the first or second stages or both of them.

SUMMARY OF THE INVENTION

According to disclosed embodiments of the invention, when building large networks a box can be used as a high radix switch.

There is provided according to embodiments of the invention a network box connected in a communication network. The box includes a first tier of leaf switches and a second tier of spine switches that is configured to exchange the packets with the first tier. The box includes first packet processing circuitry, which is configured to adaptively route the packets from the first tier to the second tier, and second packet processing circuitry, which is configured to statically route the packets from the second tier to the first tier.

According to an aspect of the invention, the second packet processing circuitry is configured to route the packets using a hash function to identify a destination in the first tier.

According to still another aspect of the invention, the destination is one of the egress ports of one of the leaf switches.

According to one aspect of the invention, the second packet processing circuitry is configured for detecting a compromised ability of a congested spine switch to forward an arriving packet from another switch, and issuing a rerouting notification from the congested spine switch.

According to a further aspect of the invention, the rerouting notification is addressed individually to the other switch.

According to yet another aspect of the invention, the arriving packet belongs to a flow, and the first packet processing circuitry is configured to respond to the rerouting notification by avoiding routing the arriving packet and subsequently arriving packets belonging to the flow through the congested spine switch.

In an additional aspect of the invention each of the leaf switches and the spine switches is provided with an instance of the first packet processing circuitry or the second packet processing circuitry, respectively.

According to one aspect of the invention, each instance of the second packet processing circuitry is configured to use an identical hash function to identify a destination in the first tier.

According to another aspect of the network box, there is a central processor that incorporates the first packet processing circuitry, and the second packet processing circuitry configured to control all the leaf switches and the spine switches.

A further aspect of the invention includes a processor configured to transmit updated routing data to the spine switches and to synchronize a changeover to the updated routing data in the spine switches.

There is further provided according to embodiments of the invention a method of communication, which is carried out in a network box by accepting packets from a network in ingress ports of a first tier of leaf switches, adaptively routing the packets from the leaf switches to a second tier of spine switches within the network box, statically routing the packets from the spine switches to designated egress ports of the leaf switches, and transmitting the packets from the designated egress ports into the network.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

According to RFC 6437, and as used herein, a flow (or data flow) is a sequence of packets sent from a particular source to a particular unicast, anycast, or multicast destination that the source desires to label as a flow. A flow could consist of all packets in a specific transport connection or a media stream.

Figure 1:
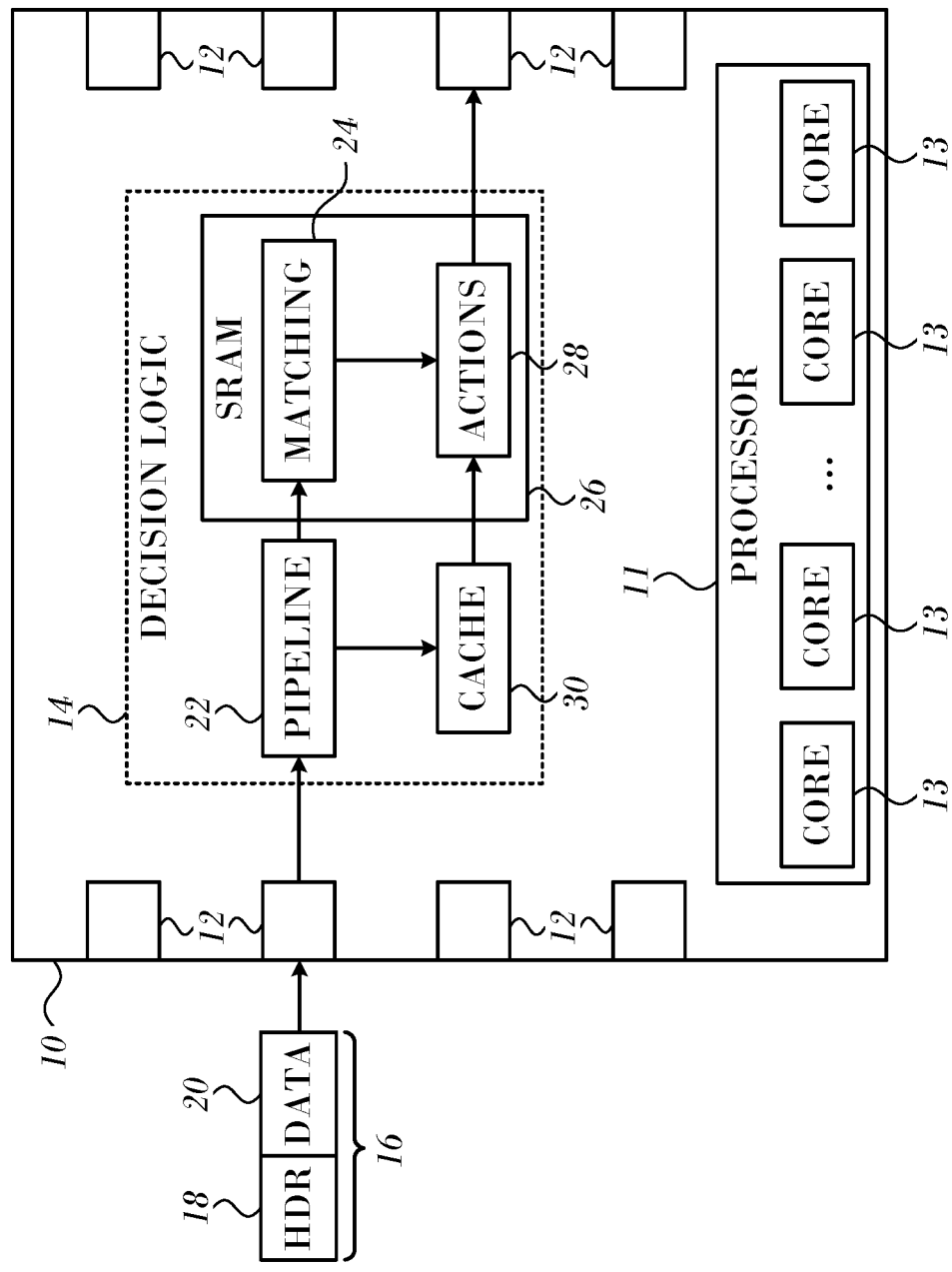
FIG. 1 is a block diagram of a typical network element, which transmits packets in accordance with an embodiment of the invention.

Turning now to the drawings, reference is now made to FIG. 1, which is a block diagram of a typical network element 10, which can be used as a switch in a box in accordance with an embodiment of the invention. It can be configured with multiple ports 12 connected to a packet communication network. A processor 11, comprising any number of cores 13, is linked to decision logic 14. The decision logic 14 applies classification rules in forwarding data packets 16 between ports 12, as well as performing other actions, such as encapsulation and decapsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 14.

In the pictured embodiment, decision logic 14 receives packets 16, each containing a header 18 and payload data 20. A processing pipeline 22 in decision logic 14 extracts a classification key from each packet, typically (although not necessarily) including the contents of certain fields of header 18. For example, the key may comprise the source and destination addresses and ports and a protocol identifier. Pipeline 22 matches the key against a matching database 24 containing a set of rule entries, which is stored in an SRAM 26 in network element 10, as described in detail hereinbelow. SRAM 26 also contains a list of actions 28 to be performed when a key is found to match one of the rule entries and may include a forwarding database. For this purpose, each rule entry typically contains a pointer to the particular action that decision logic 14 is to apply to packets 16 in case of a match. Pipeline 22 typically comprises dedicated or programmable hardware logic, which is configured to carry out the functions described herein.

Figure 2:
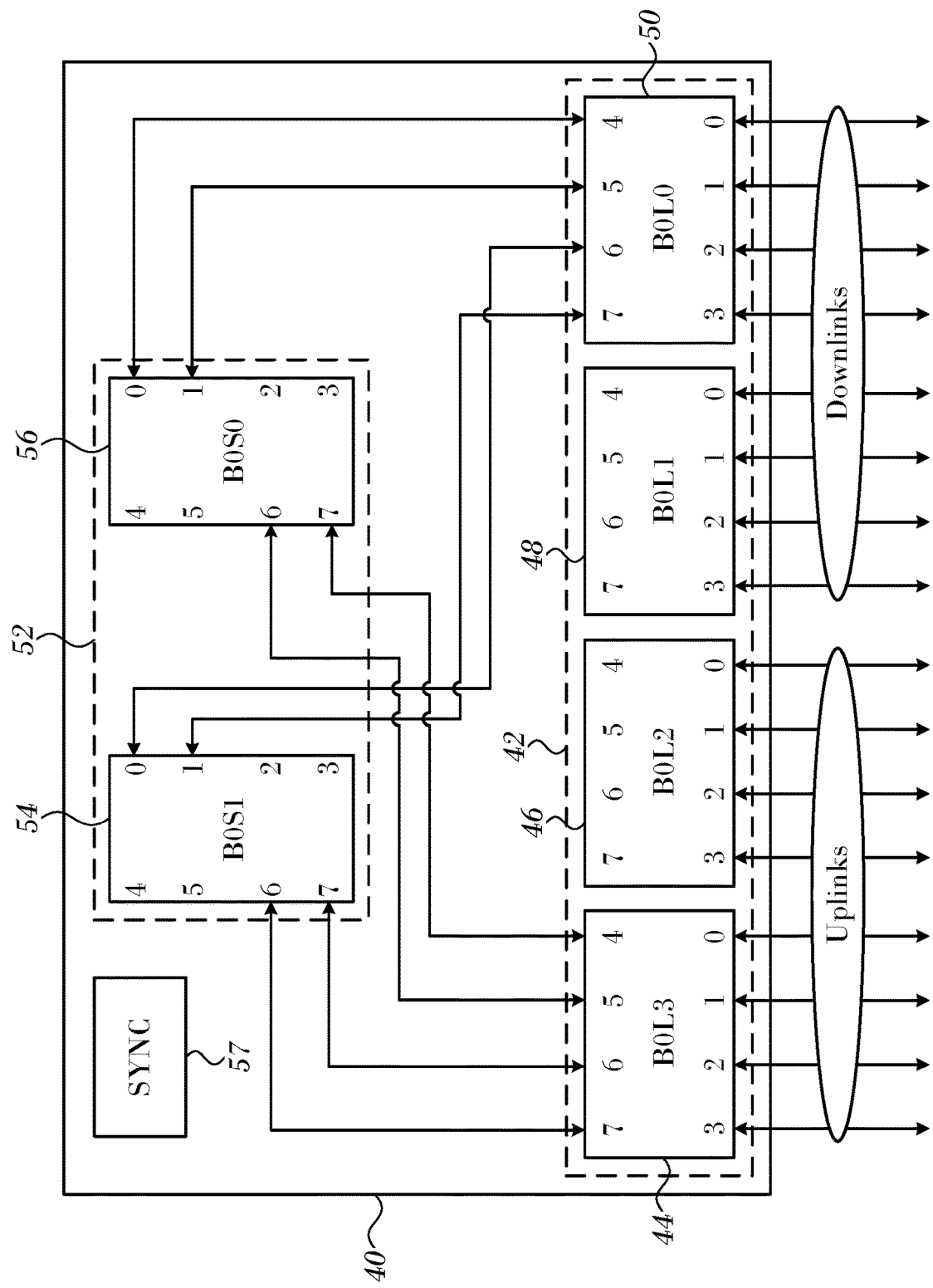
FIG. 2 is a schematic diagram of a switch with radix 16, in accordance with an embodiment of the invention.

Reference is now made to FIG. 2, which is a schematic diagram of a box 40 with radix 16, comprising a matrix of several switches, all with radix 8, in accordance with an embodiment of the invention. The switches can be separate integrated circuits, or all of them can be fabricated as a single integrated circuit. In embodiments of the invention, each of the switches include instances of the processor 11 and decision logic 14 (FIG. 1). Box 40 comprises a leaf tier 42 of four leaf switches 44, 46, 48, 50 that exchange data with a data network via network ports (port numbers 0-3) and with a spine tier 52 of spine switches 54, 56 (port numbers 4-7). While a 2:1 ratio of leaf to spine switches is shown in the switch network of the box 40, other arrangement are possible, and the box may be composed of switch elements having other radices, so long as the radix of the box exceeds the radix of other switches in the network. Typically the switches in the box 40 are realized as ASICs. Boxes of this sort can be constructed to create network switches with higher radices, for example by increasing the number or the radix of the leaf and spine switches in many combinations. The principles of the invention can be applied, mutatis mutandis, to all such combinations. A processor 57 synchronizes the switches, as described below. Boxes with three or more tiers can be also be constructed.

Each spine switch is connected to each leaf switch by at least one link between ports. Many combinations of links are possible, depending on the configuration of the switches in the box. In the example of FIG. 2, pairs of ports in each of the spine switches 54, 56 are connected to respective pairs of ports in each of the leaf switches 44, 46, 48, 50. Some connections are omitted for clarity. For example, in the leaf switch 44 ports numbers 6, 7 connect with ports numbers 6, 7 of spine switch 54, and port numbers 4, 5 connect with port numbers 6, 7 of spine switch 56. In another example, in a box of radix 8 switches having eight leaf switches and four spine switches, a port of each spine switch could be connected with a single port of each leaf switch, rather than by a pair of ports as shown in FIG. 2.

In FIG. 2, the network ports (port numbers 0-3) of leaf switches 44, 46 are uplinks, while the network ports of the leaf switches 48, 50 are downlinks. This assignment is exemplary, and other combinations of port assignments to uplink and downlink roles are possible in order to support a particular network topology. The box 40 in the example of FIG. 2 is adapted for use as a single switch in a clos (fat tree) network topology, which is a common network topology that advantageously employs switches provided by boxes of this sort.

Figure 3:
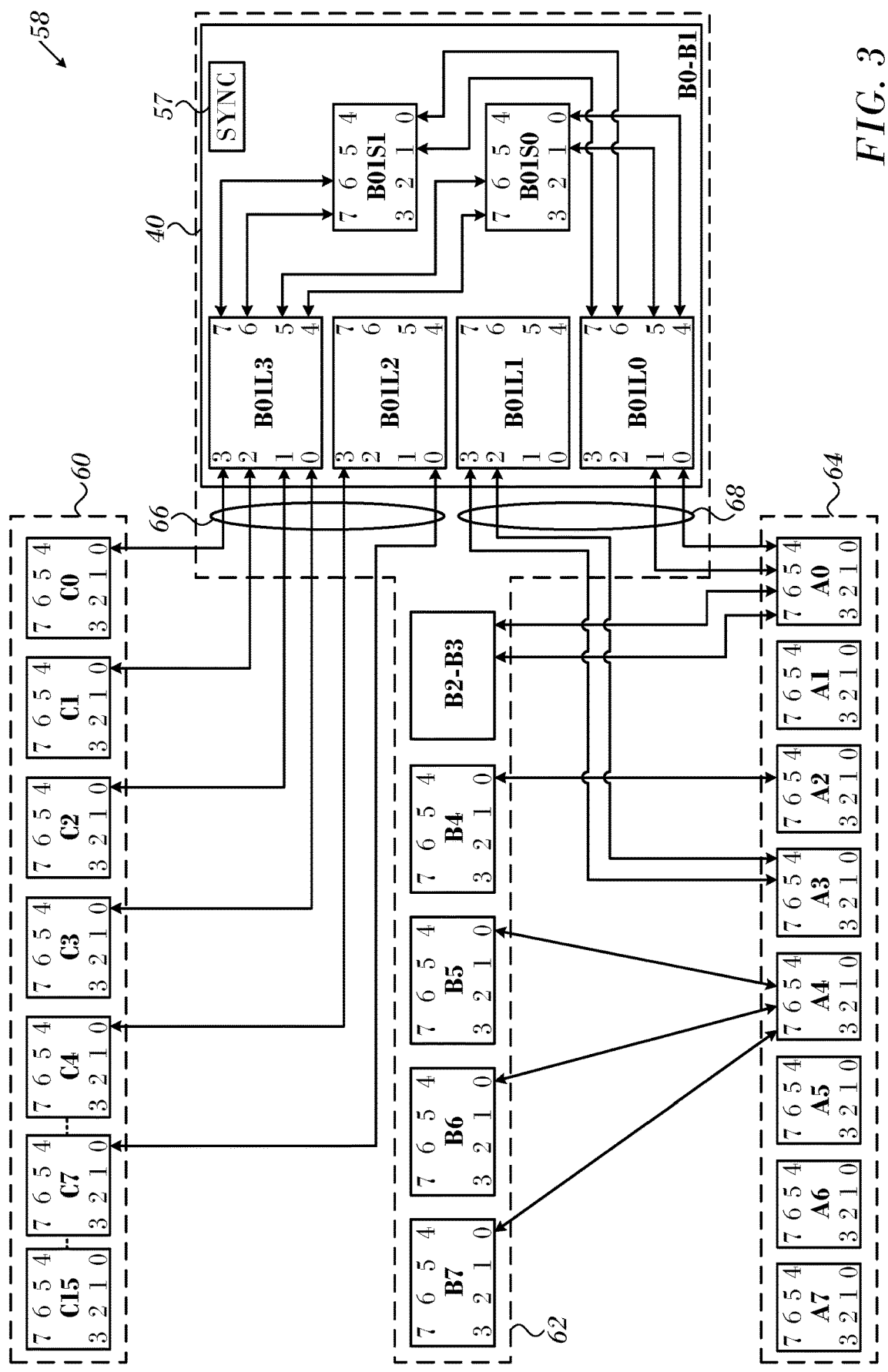
FIG. 3 is a diagram of a three-level fat tree network, in accordance with an embodiment of the invention.

Switch elements in a fat tree topology can be either single switches or boxes. Each such box constitutes a switch with a higher radix than the single switches. Reference is now made to FIG. 3, which is a three-level fat tree network 58, in accordance with an embodiment of the invention. The network 58 includes an upper tier 60, middle tier 62 and lower tier 64. The middle tier 62 includes six 25 switch elements (labeled B0-B1, B2-B3, B4, B5, B6 and B7) The switch element B0-B1 is realized as the box 40. Switch elements B4-B7 have radix 8. Box 40 (switch element B0-B1) has radix 16, as noted above in the discussion of FIG. 2, and replaces two switches with radix 8. Representative uplink connections 66 and downlink connections 68 from box 40 to upper tier 60 and lower tier 64, are shown. Although not 30 shown in detail, switch element B2-B3 may also be replaced by an instance of the box 40.

Configuring and operating a high radix switch of the sort illustrated by the box 40 presents performance issues, resulting in part from the need for data to traverse more than one tier of switches within the box. Referring again to FIG. 2, each packet of data passes through the box 40 through ingress ports of the leaf switches 44, 46, 48, 50, transiting selected spine switches 54, 56 and then exiting via exit ports of the leaf switches.

In order to guarantee that packets belonging to the same flow exit the box 40 through the same egress port, the switches in the spine tier 52 are synchronized. The spine switches use the same hash function and perform the hash on the same packet fields. Otherwise, if, for example, one of the spine switches were to be updated so as to modify the size of its ECMP groups, the distribution of flow into ports could change, causing a single flow to exit from multiple egress ports of the leaf switches.

Moreover, where there is a change in the routing protocol, such as the border gateway protocol (BGP), all of the spine switches begin to use the updated routing data at the same time. This is achieved by managing the protocol in the synchronization processor 57 (FIG. 2) that is configured to push updates to all the spine switches. Time synchronization among the spine switches assures that the changeover to the updated routing data occurs at the same time.

Figure 4:
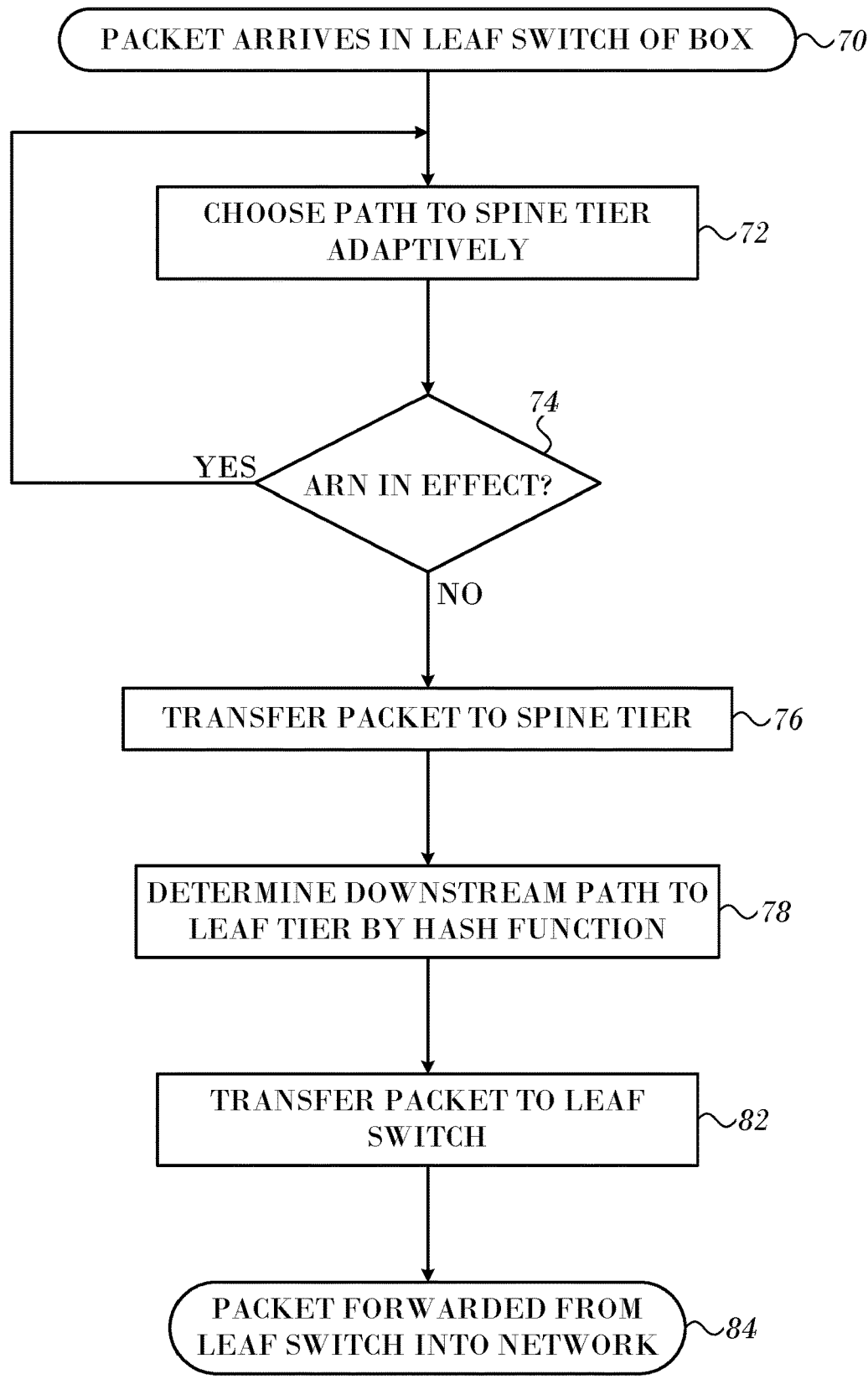
FIG. 4 is a flow chart of a method of operating a network box in accordance with an embodiment of the invention.

Reference is now made to FIG. 4, which is a flow chart of a method of operating a network box in accordance with an embodiment of the invention. The method is explained with regard to one packet and the exemplary network 58 (FIG. 3). However it will be understood that the box may receive multiple packets asynchronously in different ingress ports, all of which are processed in like manner. Moreover, the process steps are shown in a particular linear sequence in FIG. 4 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 70 a packet is transmitted to the middle tier 62, arriving from the lower tier 64 or from the upper tier 60. In either case the packet arrives at an ingress port of one of the leaf switches 44, 46, 48, 50 in the box 40 and will eventually leave the box 40 via an egress port;

The arriving packet is processed initially at step 72. In order to eventually reach an egress port, the packet must first pass from the ingress leaf switch through one of the spine switches 54, 56 and thence to one of the leaf switches 44, 46, 48, 50. The box 40 constitutes a multi-path routing system.

At step 72 one of the paths to the spine tier 52 is chosen according to a governing adaptive routing algorithm. The path ends at a selected port of a chosen spine switch. Many adaptive routing algorithms can be implemented in step 72 and in other steps of FIG. 2 that involve adaptive routing. One example is the ECMP algorithm, which balances multiple flows over multiple paths by hashing traffic flows onto multiple best paths. However, some variants of the ECMP-based load balancing algorithm do not consider traffic load and may not steer traffic away from congested links. Other adaptive routing methods vary routing based on identified congestion. Two examples are found in commonly assigned U.S. Patent Application Publication Nos. 2017/0244630 by Levy et al., and 2014/0211631 by Haramaty et al., which are herein incorporated by reference, and which can be applied to step 72, mutatis mutandis. These algorithms generally offer tradeoffs between collision avoidance, congestion, and load balancing. Detailed consideration of the tradeoffs in the selection of an adaptive routing algorithm is outside the scope of this disclosure.

Embodiments of the invention signal switch congestion by issuing notifications to a preceding switch on a chosen path. At decision step 74 it is determined if an Adaptive Routing Notification (ARN) is in effect. In some embodiments the ARN may apply to all packets being sent to the port of the spine switch selected in step 72. Alternatively, an ARN may constitute a congestion indication for a particular flow and could be ignored for packets not belonging to that flow. The algorithm chosen in step 72 and the issuance of an ARN take into consideration both congestion on the egress ports of the leaf switch (local congestion) and congestion on the egress ports of the spine switch (remote congestion). In current embodiments, when a packet of a flow is transmitted from a leaf switch to a spine switch and encounters congestion in the spine switch, the spine switch transmits an ARN to that leaf switch as a reaction to the congestion. The leaf switch is then forced to reroute packets of the flow to an alternative spine switch, even in the absence of local congestion in the leaf switch. However the selection of the alternative spine switch may take both local congestion and the ARN into account. ARNs are described in further detail in the above-noted Levy et al. and Haramaty et al. disclosures.

If an ARN is in effect at decision step 74, then the chosen port is avoided, and control returns to step 72 to iterate the path selection.

If there is no ARN in effect, the packet is transferred to the selected port of the spine switch at step 76.

Traffic moving upstream in a fat tree network outside the box 40 is usually multi-path and it is not essential that packets of a given flow exit the box through the same port. Thus, there is flexibility in the choice of a spine-to-leaf path within the box 40. For such traffic dynamic load balancing techniques may be employed in spine-to-leaf routing within the box 40.

Nevertheless, when processing such upstream traffic inside the box 40 the spine-to-leaf routing in the segment that terminates at one of the leaf switches 44, 46, 48, 50 is established statically to ensure that for a given flow, all such packets exit the box 40 through the same port. For example, in a box having three tiers of switches, only the path from the middle tier to the leaf switches need be statically established.

Traffic moving downstream in a fat tree network outside the box 40 is usually single path traffic. When processing such downstream traffic inside the box 40 the spine-to-leaf routing in the segment that terminates at one of the leaf switches 44, 46, 48, 50 has only a single path choice.

Leaf-to-spine traffic within box 40 is always dynamically load-balanced, irrespective of the direction of the traffic in the fat tree network outside of the box 40.

In some embodiments hash-based forwarding is used in step 78. The forwarding algorithm may select an egress port number of a leaf switch as described in commonly assigned U.S. Patent Application Publication No. 2017/0187614 by Haramaty et al., which is herein incorporated by reference. The hashing techniques described in commonly assigned U.S. Patent Application Publication Nos. 20170286292, 20170270119 and 20170068669, all of which are herein incorporated by reference, may be used in step 78, mutatis mutandis.

Then at step 82 the packet is transferred to a designated port of a leaf switch.

At final step 84 the packet is forwarded into the network from the egress port of the designated leaf switch. Typically the egress port of the leaf switch is determined from routing information in the packet.

The above described algorithm achieves selective load balancing within the box, i.e., on upstream paths. In downstream paths within the box 40, load balancing is sacrificed for consistency in packet egress. In some applications it is desired that all packets belonging to the same flow exit the network box through the same egress port in order to control and debug a network, recognizing that this constraint may result in packets of a flow exiting the box out of order.

Alternate Embodiments

Figure 5:
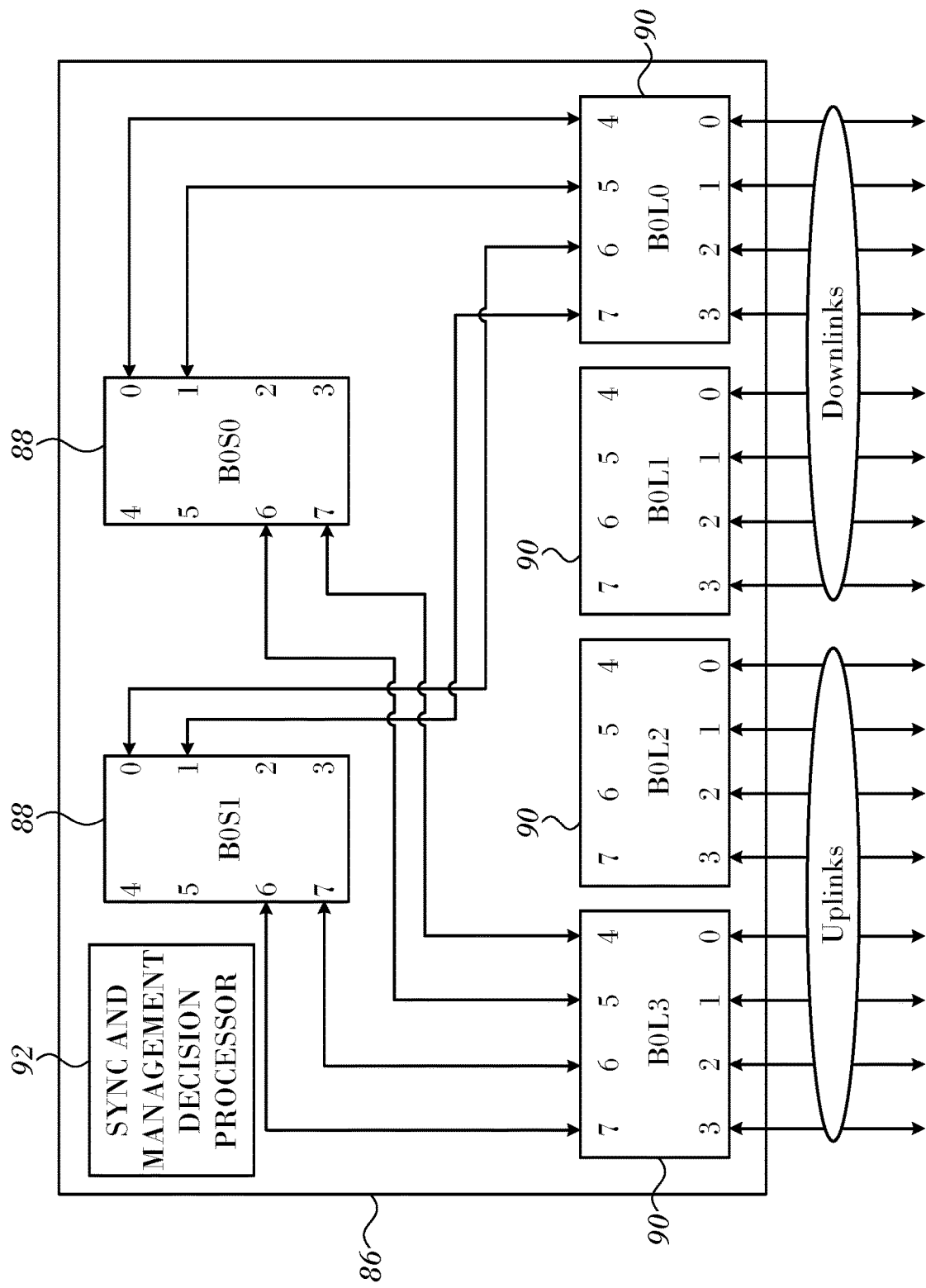
FIG. 5 is a schematic diagram of a switch with radix 16, in accordance with an alternate embodiment of the invention.

Reference is now made to FIG. 5, which is a schematic diagram of a box 86 with radix 16, comprising a matrix of spine switches 88 and leaf switches 90, all with radix 8, in accordance with an alternate embodiment of the invention. The spine switches 88 and leaf switches 90 are connected and function in the same manner as the switches in the box 40 (FIG. 2). However, there is a management decision processor 92 connected to all of the switches in the box 86. The management decision processor 92 is provided with decision logic, which carries out the functions of the processor 11 and decision logic 14 (FIG. 1) for all of the switches, as well as the synchronization functions noted above. This arrangement reduces the hardware in the box 86 compared with the box 40, with corresponding economies in power usage. Separate instances of the processor 11 and decision logic 14 may be omitted or economically modified.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A network box connected to an upper tier and to a lower tier of network switches in a communication network, the network box having a network box radix and comprising:
    leaf switches having ingress ports and egress ports for providing uplinks and downlinks between the network box and the network switches of the upper and lower tiers;
    spine switches configured to exchange packets with the leaf switches, the leaf switches and the spine switches having respective switch radices, wherein the network box radix exceeds each of the switch radices; and
    first packet processing circuitry configured to adaptively route the packets from the leaf switches to the spine switches, each of the leaf switches having an instance of the first packet processing circuitry; and
    second packet processing circuitry configured to:
        (a) associate the packets with flows; and
        (b) for each of the flows statically route the packets associated therewith from the spine switches to a respective predetermined leaf switch to exit the network box through a predetermined egress port of the predetermined leaf switch,
    each of the spine switches having an instance of the second packet processing circuitry, wherein each instance of the second packet processing circuitry is configured to execute a same hash function on identical fields of the packets to identify the predetermined leaf switch and the predetermined egress port, at least a portion of the packets being routed through the egress ports of the leaf switches into the network switches of the upper tier via the uplinks.

2. The network box in accordance with claim 1, wherein the second packet processing circuitry is configured for:
    detecting a compromised ability of a congested spine switch to forward an arriving packet from another switch; and
    issuing a rerouting notification from the congested spine switch.

3. The network box in accordance with claim 2, wherein the rerouting notification is addressed individually to the other switch.

4. The network box in accordance with claim 2, wherein the arriving packet belongs to a flow, and wherein the first packet processing circuitry is configured to respond to the rerouting notification by avoiding routing the arriving packet and subsequently arriving packets belonging to the flow through the congested spine switch.

5. The network box in accordance with claim 1, further comprising a processor configured to transmit updated routing data to the spine switches and to synchronize a changeover to the updated routing data in the spine switches.

6. A method of communication comprising the steps of:
    in a network box accepting packets from a network in ingress ports of a first tier of leaf switches, wherein the network box is connected by uplinks and downlinks to an upper tier and to a lower tier of network switches in a communications network;
    adaptively routing the packets from the leaf switches to a second tier of spine switches within the network box, the leaf switches and spine switches having respective radices, wherein a radix of the network box exceeds each of the respective radices of the leaf switches and the spine switches;
    associate the packets with flows;
    for each of the flows statically routing the packets associated therewith from the spine switches to a predetermined one of the leaf switches by applying an identical hash function on identical fields of the packets in each of the spine switches to identify an egress port in in the predetermined one of the leaf switches; and
    transmitting at least a portion of the packets through the identified egress port into the network switches of the upper tier via the uplinks.

7. The method in accordance with claim 6, further comprising the steps of:
    detecting a compromised ability of a congested spine switch to forward an arriving packet from another switch; and
    sending a rerouting notification from the congested spine switch.

8. The method in accordance with claim 7, further comprising addressing the rerouting notification individually to the other switch.

9. The method in accordance with claim 7, wherein the arriving packet belongs to a flow, further comprising responding to the rerouting notification by avoiding routing the arriving packet and subsequently arriving packets belonging to the flow through the congested spine switch.

10. The method in accordance with claim 6, further comprising the steps of:
    transmitting updated routing data to the spine switches and;
    synchronizing a changeover to the updated routing data in the spine switches.

* * * * *